3,093,493
COATING MATERIAL FOR CORROSION PREVENTION
Helmut von Freybold, Dusseldorf-Oberkassel, Germany, assignor to Philadelphia Quartz Company, Philadelphia, Pa., a corporation of Pennsylvania
No Drawing. Filed Nov. 23, 1960, Ser. No. 71,157
Claims priority, application Germany Nov. 26, 1959
8 Claims. (Cl. 106—14)

INTRODUCTION

This invention generally relates to a novel protective coating composition and more particularly it relates to a protective coating composition which has superior storage properties as compared with similar prior art coating compositions. These coatings protect the substrate to which they are applied.

THE PRIOR ART AND ITS ADVANTAGES

Coating compositions comprising a mixture of zinc powder and an alkali metal silicate are known. Such compositions have been found to be quite useful for protecting metals, and particularly iron, from the weather and from sea water. Despite the usefulness of such compositions, they suffer from the practical disadvantage that once they are prepared and placed in a closed container, the silicate reacts rather quickly with the zinc giving off hydrogen. Such coating compositions can therefore not be prepared and sold in the same manner as ordinary coating compositions. Use of such compositions has been largely restricted to instances where the compositions can be prepared at the site. Some inhibitors have been proposed for retarding the reaction between the alkali silicate and the zinc dust, but such stabilization usually doesn't last more than 3 days, which is not enough for practical purposes.

OBJECTS

A primary object of this invention is to produce coating compositions consisting predominantly of metallic powder, an alkali silicate, and certain additives and which will remain stable for relatively long periods of time. A more specific object is to produce coating compositions containing zinc powder and sodium silicate which are inhibited against the production of hydrogen for a considerable number of days and which therefore have an improved shelf life. These and other objects and advantages will be more apparent after reading the following description.

THE INVENTION BROADLY

In its broadest aspects this invention encompasses a coating composition comprising in combination:

(a) An aqueous alkali metal silicate solution,
(b) A finely divided metallic powder,
(c) An alkali chromate or dichromate, and
(d) An organic compound having at least two amino groups.

THE INVENTION MORE SPECIFICALLY

The preferred alkali silicate is sodium silicate, although potassium silicate has also been found to be quite satisfactory. The precise ratio of $Na_2O:SiO_2$ is not critical and likewise the concentration of the sodium silicate in water is not critical. Sodium silicate having a $Na_2O:SiO_2$ ratio of about 1:3.2 and 1:3.8 at a concentration of 28–42° Bé. is one of the more common commercially available sodium silicates and has been found to be quite satisfactory.

Zinc powder is the preferred metallic powder. The exact particle size of the zinc powder is not critical, although it has been generally observed that the effectiveness of the coating composition improves as the particle size decreases. The very finely divided zinc powders which will even react with water to give off hydrogen are especially preferred. By way of specific example, particle sizes below 200 mesh are desirable and particle sizes below 325 mesh especially preferred. In general, more zinc is added on a weight basis than sodium silicate and I prefer about two to six times as much.

Of the alkali chromates and dichromates, sodium and potassium chromates and dichromates are preferred because of their availability.

Based upon my experimentation, it appears that any organic compound having at least two amino groups would be satisfactory. Among the compounds which I have tested and found to be quite suitable are phenylenediamine, benzidine, guanidine, melamine and alkyl amines such as hexamethylene diamine. My best results have been achieved with hexamethylenetetramine (urotropine).

Surprisingly it was found that chromates alone or organic diamines alone did not produce satisfactory results.

Only small amounts of the alkali chromate and the organic diamines need to be added to impart stability. A general range would be from about 0.1 to 2.0% (based on the silicate) for each of these ingredients although usually a range from about 0.1 to 1.0% is quite sufficient. Larger amounts can be used but usually do not produce a stability increase which justifies such increased amounts. Also, amounts much less than the lower limits set forth above usually only result in decreased stability.

The chromate and organic amine compounds may be added, either as fine powder or in the form of a solution to the remaining ingredients of the coating composition at nearly any stage of the manfacturing operation.

OTHER COMPONENTS

Under certain circumstances it may prove desirable to incorporate other ingredients or components with the aforementioned components in order to achieve certain additional specifically desired properties in the final coating composition. For example, the coating composition may be thickened by adding about 0.01–3.0 weight percent, based on the whole mixture, of sodium alginate, methyl cellulose or starch. In many cases, it is helpful to add small amounts, in the order of 0.5–2.0 weight percent, of emulsifying agents such as ethylene oxide addition compounds of the fatty alcohols or fatty acids (e.g. those having 12–18 carbon atoms). In order to increase the adherence of the coatings, especially to sheet metal surfaces which have not been completely degreased, it is advantagous to add to the mixture about 0.5–2.0 weight percent of methyl or ethyl acetate. Kaolin, bentonite and montmorillonite clays, as well as zinc oxide, may be added as extenders.

EXAMPLES

The following examples are presented to illustrate the invention, and particularly preferred embodiments thereof. Unless otherwise specified the parts and percentages are by weight and the temperature is room temperature. It should be understood that these examples are not intended to limit the invention and that obvious changes may be made by those skilled in the art without changing the essential characteristics and the basic concept of the invention.

*Example No. 1*

450 grams of very finely powdered zinc were stirred into 100 grams of 30° Be'. sodium silicate solution having a ration of $Na_2O:SiO_2$ of 1:3.79. To this mixture were added 0.1 gram of hexamethylenetetramine and 0.4 gram of potassium chromate and, finally, 60 grams of a 2% solution of sodium alginate.

This coating has good brushability and was stable for practically two weeks. A similar composition without the amine and K₂CrO₄ was unusable in about ten hours.

*Example No. 2*

45 kg. of the finest powdered zinc, having a particle size of about 99.5% below 350 mesh, 25 grams of hexamethylenetetramine and 45 grams of sodium chromate were stirred into 10 kg. of sodium silicate solution (37–40° Bé'.; 1NaO:3.3SiO₂). Subsequently 100 grams of an emulsifying agent (an addition product of ethylene oxide and a higher fatty alcohol) and 100 grams of ethyl acetate were worked in.

The mixture had a working life of some two weeks. This product formed a coating which adhered firmly to incompletely degreased sheet metal, did not peel, and was resistant to sea-water.

*Example No. 3*

45 kg. of the same fine powdered zinc, 25 grams of hexamethylenediamine and 45 grams of sodium chromate were stirred into 10 kg. of sodium silicate solution (37–40° Bé'.; Na₂O:3.3SiO₂). Subsequently 100 grams of the emulsifying agent used in Example No. 2 as well as 100 grams of ethyl acetate were worked in. This readily brushable mixture proved to be very useful for coating incompletely degreased sheet metal. It had a working life of at least eight days.

*Example No. 4*

A specific quantitative study was made of the effect of these inhibitors on the reaction between a finely powdered zinc and an alkali silicate solution. A uniform paste was made up using 900 parts by weight of Merck reagent grade zinc dust and having 90–95% of its particles finer than 325 mesh, and 200 parts by weight of "N" sodium silicate sold by the Philadelphia Quartz Company. This sodium silicate contains 8.9 weight percent of Na₂O and has a Na₂O:SiO₂ mol ratio of 1:3.32.

Half of this paste was labeled "A" and the remaining portion was labeled "B." 0.1 part of hexamethylenetetramine and 0.2 part by weight of finely powdered K₂CrO₄ were carefully dispersed in portion B. Parts A and B were then placed in separate containers, each having a vent passing to inverted 75 ml. glass tubes wherein any evolved gas was trapped over water.

Within 16 hours paste A evolved more than 75 ml. of gas whereas paste B evolved no appreciable gas during its first 6 days at room temperature. The volume of escaped gas from B was 6.5 ml. after the eighth day and 11 ml. after the ninth. The final reading was taken after the tenth day at which time the volume of gas evolved from B was 12.5 ml.

These tests clearly demonstrated the utility and novelty of this invention.

*Example No. 5*

450 grams of the same finely-divided zinc dust which was used in Example No. 1 were stirred into 100 grams of sodium silicate solution having a density of 30° Bé'. and a weight percent ratio of 1Na₂O:3.79SiO₂. 0.1 gram of phenylenediamine and 0.4 gram of potassium chromate were added to this mixture, and finally 60 grams of a 2% solution of sodium alginate were mixed in.

This composition had a useful working life of about two weeks and the coating adhered firmly to sheet metal.

*Example No. 6*

To the initial mixture of finely-divided zinc dust and sodium silicate solution of Example No. 5 were added 0.1 gram of benzidine and 0.4 gram of potassium chromate. Finally, 60 grams of a 2% solution of sodium alginate were added to complete the coating composition.

This composition also had a working life of at least two weeks and adhered firmly to sheet metal.

*Example No. 7*

10 kg. of sodium silicate solution having a density between 37 and 40° Bé'. and a weight percent ratio of Na₂O:3.3SiO₂ were mixed with 45 kg. of the zinc dust used in Example No. 1. 25 grams of guanidine and 45 grams of sodium chromate were then mixed into the composition and subsequently 100 grams of an emulsifier (an addition product of ethylene oxide and a higher fatty alcohol) and also 100 grams of ethyl acetate were worked into the composition.

This, again, had a useful working life of at least two weeks and adhered firmly to sheet metal, forming a corrosion-resistant coating.

*Example No. 8*

To the initial mixture of zinc dust and sodium silicate solution described in Example No. 7 were added 25 grams of melamine and 45 grams of sodium chromate, and then 100 grams of the same emulsifier and 100 grams of ethyl acetate were worked in.

The mixture again had a working life of at least two weeks and adhered firmly to sheet metal, forming a corrosion-resistant coating.

*Example No. 9*

Into 8 kg. sodium silicate solution of 45° Bé. (ratio of Na₂O:SiO₂=1:2.8), 45 kg. of finely powdered zinc dust (99.9% of the particle size below 350 mesh) were stirred. To this mixture were added 20 grams hexamethylene diamine and 35 grams sodium chromate. Subsequently 80 grams of an emulsifying agent (an addition product of ethylene oxide and higher fatty alcohols (C₁₂–C₁₈)) and 120 grams of methyl acetate were worked in. It is preferably used to smooth out unevenness in surface coatings and surface joints.

*Example No. 10*

Into 20 kg. sodium silicate solution of 28° Bé. (ratio of Na₂O:SiO₂=1:3.75), 45 kg. of finely powdered zinc dust were stirred. To this mixture were added 50 grams hexamethylene diamine and 90 grams sodium chromate. A fluid coating was obtained, which is preferably used for the restoration of old coatings containing sodium silicate solution.

CONCLUSION

More or less specific claims will be presented hereinafter and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art and still other obvious equivalents could be readily ascertained upon rather simple, routine non-inventive experimentation. Certainly no invention would be involved in substituting one or more of such obvious equivalents for the materials specifically recited in the claims. I intend that all such obvious equivalents be encompassed within the scope of this invention and patent grant in accordance with the well-known doctrine of equivalents, as well as changed proportions of the ingredients which do not render the composition unsuitable for the disclosed purposes.

The term "consisting essentially of" as used in the following claims is meant to include compositions containing the named ingredients in the proportions stated and any other ingredients which do not destroy the usefulness of the compositions for the purposes stated in the specification.

What is claimed is:

1. A corrosion-resistant coating composition, composed of finely-divided metallic zinc, alkali silicate and minor quantities of additives, said additives consisting essentially of alkali chromates and an organic compound containing at least two amino groups in its molecule selected from the group consisting of hexamethylenetetramine, phenylenediamine, benzidine, guanidine and melamine, each of said additives being present in an amount between about 0.1 to 2.0 percent by weight, based on the alkali silicate.

2. A corrosion-resistant coating composition having improved storage properties consisting essentially of the following combination:
   (a) 100 parts by weight of an aqueous sodium silicate solution;
   (b) From 100 to 600 parts by weight of finely-divided metallic zinc;
   (c) 0.1 to 2.0 parts by weight of potassium chromate;
   (d) 0.1 to 2.0 parts by weight of hexamethylenetetramine.

3. A coating composition according to claim 2 which contains between 200–600 parts by weight of finely-divided metallic zinc.

4. A coating composition according to claim 2 which additionally contains 0.5–2.0 parts by weight of an emulsifying agent comprising the addition product of ethylene oxide and a $C_{12}$–$C_{18}$ fatty alcohol.

5. A coating composition according to claim 2 which additionally contains 0.5–2.0 parts by weight of a compound selected from the group consisting of methyl acetate and ethyl acetate.

6. A coating composition according to claim 2 which additionally contains 0.01 to 2.0 weight percent of sodium alginate.

7. A coating composition according to claim 2 which additionally contains 0.01–2.0 weight percent of methyl cellulose.

8. A coating composition according to claim 2 which additionally contains 0.01–2.0 weight percent of starch.

References Cited in the file of this patent

UNITED STATES PATENTS

| | | |
|---|---|---|
| 2,944,919 | Morris et al. | July 12, 1960 |
| 2,968,571 | Lantz | Jan. 17, 1961 |

OTHER REFERENCES

Condensed Chemical Dictionary, published 1950, by Reinhold Pub. Corp., N.Y.C., pages 23, 279, 434, 437–8 and 624.

Schwartz-Perry: "Surface Active Agents," published 1949, by Interscience Publishers, N.Y.C., pages 202–203.